Figure 1:
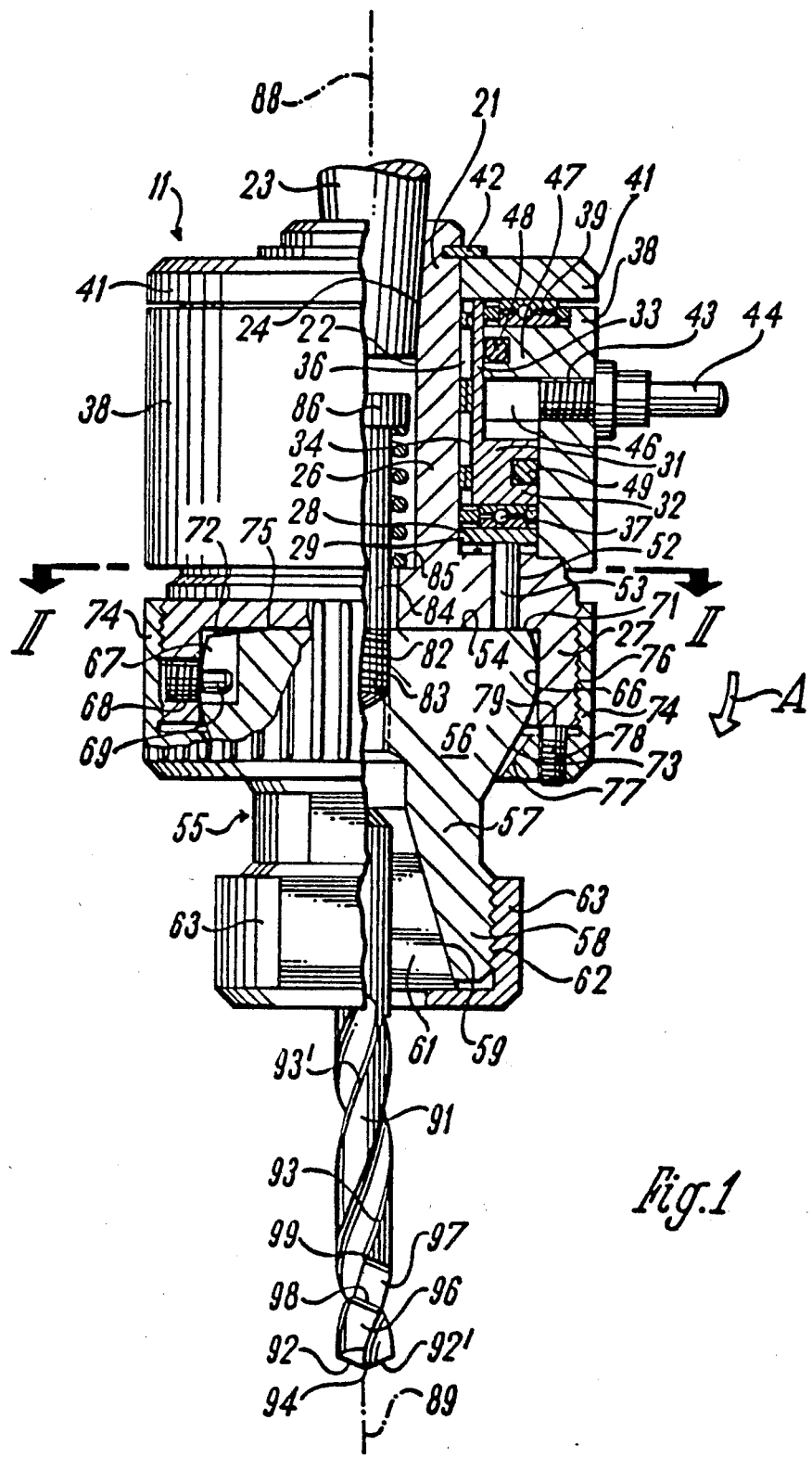

United States Patent [19]

Duffner

[11] Patent Number: 4,589,805
[45] Date of Patent: May 20, 1986

[54] BORING AND DEBURRING HEAD AND BORING AND DEBURRING TOOL CAPABLE OF BEING FASTENED THEREIN, AND METHOD FOR BORING AND DEBURRING A WORKPIECE

[75] Inventor: August Duffner, Schonach, Fed. Rep. of Germany

[73] Assignee: Kadia-Diamant Maschinen- und Werkzeugfabrik O. Kopp GmbH & Co., Fed. Rep. of Germany

[21] Appl. No.: 614,163

[22] PCT Filed: Sep. 10, 1983

[86] PCT No.: PCT/EP83/00237
§ 371 Date: May 15, 1984
§ 102(e) Date: May 15, 1984

[87] PCT Pub. No.: WO84/01117
PCT Pub. Date: Mar. 29, 1984

[51] Int. Cl.⁴ .................... B23B 51/10; B23B 31/04
[52] U.S. Cl. .......................... 408/21; 408/22; 408/224; 408/238; 408/714; 279/5
[58] Field of Search ............ 408/1, 239 R, 238, 224, 408/714, 225, 13, 22, 21, 115 R; 409/191, 211; 279/5, 28, 4

[56] References Cited

U.S. PATENT DOCUMENTS

| | | | |
|---|---|---|---|
| 1,308,681 | 7/1919 | Prideaux | 279/76 |
| 1,471,866 | 10/1923 | Simpson | 408/225 |
| 2,764,767 | 10/1956 | Adlaf | 408/225 |
| 2,969,000 | 1/1961 | Grobecker | 408/234 |
| 3,261,236 | 7/1966 | Flannery | 408/714 |
| 3,594,537 | 7/1971 | Morgenegg | 279/5 |
| 3,692,321 | 9/1972 | Shattuck | 279/4 |

FOREIGN PATENT DOCUMENTS 0075061 3/1983 European Pat. Off. .

Primary Examiner—James M. Meister
Assistant Examiner—John L. Knoble
Attorney, Agent, or Firm—Jones, Tullar & Cooper

[57] ABSTRACT

The boring and milling head (11) is designed to receive a boring and milling tool (91) provided with a clamping device (55) having a hollow clamping cone (57) and a conical clamping wedge (61), the device being connected in order to resist torsion, to a drive element (21) which may be coupled with a rotary driven boring bar or with another similar mounting. In order to perform a boring and milling in a single operation with the overmentioned boring and milling head (11), without having to change the tool and/or the position of the boring bar or of the work piece, the longitudinal axis of the clamping device (55) containing the boring and milling tool (91) may pivot with respect to the rotation axis (88) of the drive element (21).

5 Claims, 5 Drawing Figures

BORING AND DEBURRING HEAD AND BORING AND DEBURRING TOOL CAPABLE OF BEING FASTENED THEREIN, AND METHOD FOR BORING AND DEBURRING A WORKPIECE

The present invention relates to a boring and deburring head for fastening of a boring and deburring tool, to a boring and deburring tool capable of being fastened in such a boring and deburring head, to a combination of boring and deburring head and tool, and to a method for boring and deburring a workpiece. The head has a clamping device with a clamping cone and a conical clamping wedge, the clamping device being connected in a twist-free manner with a drive element that can be coupled with a rotationally driven bore spindle or the like, i.e., the clamping device is connected to the drive element so that relative rotation between the two is prevented. The tool is in the form of a spiral drill having front radial main cutting edges and helically extending secondary cutting edges.

When bores are made in workpieces, it is necessary in a first operation to make the bore itself, for instance by means of a spiral drill, and then in a second and possibly even a third operation to debur the outer as well as the inner rim of the bore, for instance by means of a countersink tool or a deburring brush. This is relatively expensive, not only in terms of the tool but also of the time required to retool or to move the workpiece or tool in multiple-spindle automatic boring machines.

It is the object of the present invention to devise a boring and deburring head/and or a boring and deburring tool capable of being fastened therein, and a method for boring and deburring a workpiece, each as generally described above with which the boring and deburring can be performed in a single operation, that is, without changing tools and/or the position of the boring spindle or the workpiece.

This object is attained, in a boring and deburring head, a boring and deburring tool, a combination of a boring and deburring head and tool, and a method of the above-described types, by holding the clamping device in such a manner that it is shiftable in terms of its longitudinal axis with respect to the axis of rotation of the drive element, and by holding the clamping cone with its rear area movably in a cup-shaped area of the drive element, preferably in that the rear area of the clamping cone has a spherical circumferential face which is inserted without substantial radial play into an inner cylindrical face of the cup-shaped area of the drive element.

Because of the shiftable disposition of the clamping device of the boring and deburring head, it is possible, after the bore has been made, to debur both rims of the bore immediately thereafter, in the same operation, or to provide them with a chamfer. This is accomplished particularly in that first the bore itself is made with the aid of the drill and then, when the just-drilled or bored workpiece is disposed directly between the two cutting flanks of the deburring groove, the clamping device holding the boring and deburring tool is briefly shifted, during the rotation, in a direction in which the deburring groove moves in the direction of the bore rims. During this merely pulse-like shifting of the clamping device, the bore rims are deburred by the cutting flanks. Once the shifting is terminated, the boring and deburring tool can be retracted back out of the bore, the making of which is now complete.

It is possible to shift the clamping device holding the boring and deburring tool parallel to the axis of rotation of the drive element and to return it back in the same direction. However, according to a preferred exemplary embodiment of the present invention, the longitudinal axis of the clamping device is pivoted, relative to the axis of rotation of the drive element, about an area remote from the tip of the boring and deburring tool. This simple movement is preferably made possible in that the clamping cone of the clamping device is held, with its rearward area having a spherical surface, in a movable manner in a cup-shaped area of the drive element.

The drive of this pivoting movement of the clamping device may be mechanical, via a contoured surface, or electromagnetic or the like, by way of example. According to one exemplary embodiment of the present invention, the shifting movement of the clamping device relative to the drive element is performed by means of a pneumatic piston-cylinder unit; to simplify the pulsed triggering, the piston-cylinder unit can be acted upon on one end, and a restoring spring which returns the clamping device to its initial position is provided. This can be accomplished with relatively simple structural parts which require little space.

The deburring process can be performed differently in terms of quality. That is, it is possible to produce a chamfer of predetermined size simultaneously with the deburring. In order to be able to perform this in a selectable manner, a further exemplary embodiment of the invention provides that an adjusting ring is provided on the boring and deburring head, being capable of being screwed onto the drive element and serving, by means of a selected spacing from the clamping cone, to adjust the magnitude of the pivoting range of the clamping cone. Depending on the size of the pivoting range, which may for instance be up to a maximum of 7°, a chamfering of the bore rims of greater or lesser size or width is produced.

In accordance with the initially mentioned preferred exemplary embodiment of the present invention, the deburring groove of the boring and deburring tool is provided with a cutting edge on both its front and its rear flank, so that as the clamping device pivots both the bore rims, that is, both the inner and outer rims, can be deburred at once. This can be accomplished for both flat and curved workpieces; in cases where the chamfering of the bore rims is to be done simultaneously both inside and outside, the angle of the two cutting flanks must be identical for flat workpieces and different for curved workpieces.

According to a further exemplary embodiment of the present invention, there is also a provision for producing two bores, opposing one another in axial alignment, in a hollow workpiece and for simultaneously deburring the rims of these bores. This is done by providing the boring and deburring tool not with merely one deburring groove but rather with two deburring grooves, disposed in axial alignment one after the other and spaced apart from one another.

Figure 2:
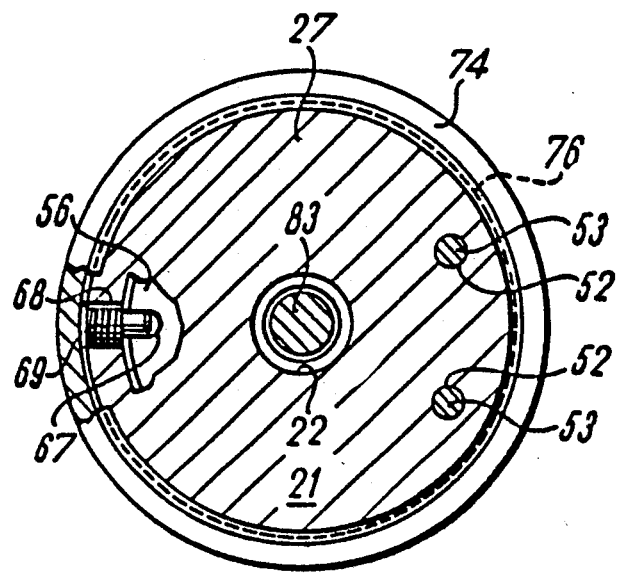
Figure 3:
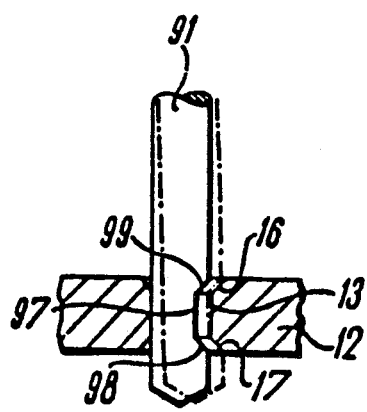
Figure 4:
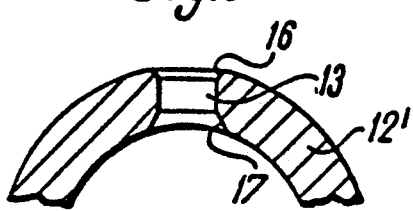
Figure 5:
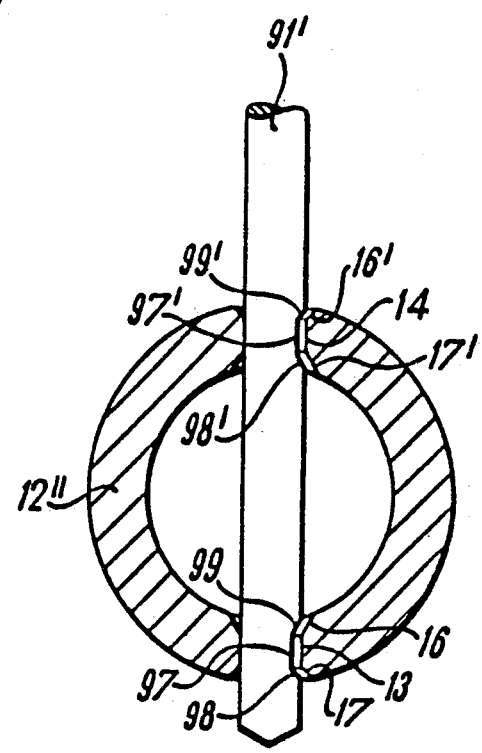

Further details and embodiments of the invention are found in the ensuing description, in which the invention is described and explained in detail in terms of the exemplary embodiments in the drawing. Shown are:

FIG. 1, an illustration, partially in an elevation and partially in a longitudinal section, of a boring and deburring head according to a preferred exemplary embodiment of the present invention, having a boring and deburring tool according to a preferred exemplary embodiment of the present invention fastened in it;

FIG. 2, a section taken along the line II—II of FIG. 1;

FIG. 3, a schematic sectional view showing the boring and deburring tool in the two work positions and lowered into a flat workpiece;

FIG. 4, in cross section, a curved workpiece which is machined with a boring and deburring tool according to a variant of the tool of FIG. 3; and FIG. 5, seen schematically one above the other, a cylindrical workpiece the opposing, aligned bores of which are produced by means of a boring and deburring tool according to another exemplary embodiment of the present invention.

The boring and deburring head 11 shown in FIGS. 1 and 2 and corresponding to a preferred exemplary embodiment of the present invention serves, in combination with a boring and deburring tool 91 and 91' shown in FIGS. 3–5 in terms of two exemplary embodiments, to produce one or two through bores 13, 14 in a workpiece 12, 12' or 12'' in one operation and to deburr these through bores 13, 14 at both the inlet and outlet edges, 16, 16' and 17, 17', respectively, and thereby to provide them with a chamfer. The workpieces 12, 12', 13'' may be either flat, curved or hollow. The boring and deburring tool 11 is embodied such that it can be used on an automatic boring spindle of any arbitrary type.

The boring and deburring head 11 according to the invention has a hollow drive element 21, which has a longitudinally centered, axial, stepped through bore 22, the rearward end of which is provided with an internal thread or a Morse cone for being connected in a twist-free manner to a drive tang 23 i.e., the drive element 21 is connected to the drive tang 23 so that relative rotation between the two is prevented. The drive tang 23 is embodied such that it can be fastened into a boring spindle, drill chuck or the like of a machine tool. The one-piece drive element 21 has a rearward shaft-like area 26 and a front cup-shaped area 27, which are embodied substantially cylindrically at the outer circumference and which have different inner and outer diameters; they are disposed coaxially with one another, and the rear end of the cup-shaped area 27 has an axial annular face 28, which is immediately adjacent to the outer circumference of the shaft-like area 26 and has an outer diameter which is smaller than the outer diameter of the cup-shaped area 27. An annular disc 29 is disposed spaced apart by a short distance from and opposite the axial annular face 28 of the cup-shaped area 27. The radial dimensions of the annular disc 29 correspond to those of the axial annular face 28, and so the annular disc 29 concentrically and immediately surrounds the shaft-like area 26 of the drive element 21. Adjoining the annular disc 29 toward the rear is an annular piston 31, which comprises a hollow collar part 32 of larger diameter and a hollow shaft part 33 of smaller diameter. The through bore 34 of the annular piston 31 is embodied such that a radial needle bearing 36 is disposed between the outer circumference of the shaft-like area 26 of the drive element 21 and the inner circumference of the annular piston 31. The annular piston 31 is disposed such that the annular disc 29 faces the collar part 32 of the annular piston 31, and an axial thrust bearing 37 is disposed between the annular disc 29 and the collar part 32.

A housing sheath 38 is disposed surrounding the annular disc 29 and the annular piston 31, being supported at one end on the cup-shaped area 27 of the drive element 21 and at the other via an axial thrust bearing 39 on an end disc 41, which is axially held firmly by a Seeger ring 42 held in the shaft-like area 26 of the drive element 21. At one location on the circumference of the housing sheath 38, which is stationary or in other words does not rotate with other parts, a bore 43 is provided, into which a hose connection nipple 44 is screwed from the direction of the outer circumference, for supplying compressed air. Opposite this bore 43, there is an annular air chamber 46, which is defined opposite the bore by the respective outer circumference surface area of the shaft part 33 of the annular piston 31 and in the axial direction, on one end, by the associated annular face of the collar part 32 of the annular piston and, on the other end, by the associated annular face of a collar 47 of the housing sheath 38, this collar 47 protruding radially inward. This inner collar 47 of the housing sheath 38 and the collar part 32 of the annular piston 31 are sealed off from the shaft part 33 of the annular piston 31 and from the housing sheath 38, respectively, by means of respective O rings 48 and 40 such that they are tight with respect to compressed air.

As shown in FIG. 2, bores 52 are provided in two areas of the cup-shaped area 27 of the drive element 21, each bore receiving a pressure pin 53 which is long enough that in the state of rest of the boring and deburring head 11 it is supported on one end on the annular disc 29, which is disposed spaced apart from the annular face 28, and on the other end it extends as far as, or is flush with, the bottom 54 of the cup-shaped area 27. The two pressure pins 53 are located on a common diameter and a secant intersecting this diameter circle. In other words, the two pressure pins 53 are disposed on only one half-ring-shaped side of the annular disc 29 or of the cup-shaped area 27.

The rear area 56 of a clamping cone 57 of a clamping device 55 is received in a twist-free manner in the cup-shaped area 27 of the drive element 21 i.e., the rear area 56 of the clamping cone 57 is connected to the drive element 21 in the cup-shaped area 27 thereof so that relative rotation between the clamping device and the drive element is prevented. The front area 58 of the clamping cone 57 has an inner cone 59, into which a clamping wedge 61, which is slit intermittently from both sides, of the clamping device 55 is inserted; the clamping wedge is capable of receiving the boring and deburring tool 91 or 91' fastened in it. To this end, via the outer thread 62 of the front area 58 of the clamping cone 57, a sheath-like clamping nut 63 is screwed on, and with its bottom part it presses the clamping wedge 61 into the inner cone 59 of the front area 58 of the clamping wedge and thus holds the tool 91, 91' in a frictionally engaged manner.

The rear area 56 of the clamping cone 57 is embodied spherically on its outer circumferential surface 66, and the diameter of this partial sphere of this surface 66 is equal to the inner diameter of the cup-shaped area 27, which is cylindrical on the inside, of the drive element 21. At one point of the circumference, which is approximately opposite the circumferential area of the two pressure pins 53, the spherical surface 66 is provided with an axial groove 67, the axial length of which extends over a substantial portion of the length of the rear area 56 of the clamping cone. Opposite this axial groove 67, a radial threaded bore 68 is provided in the cylindrical wall of the cup-shaped area 27 of the drive element 21, and a driving pin 69 can be threaded into the radial threaded bore 68, the inner end of the pin 69 passing radially into the axial groove 67 without substantial play in the circumferential direction and thereby creating a non-twisting connection between the drive element 21 and the clamping cone 57. The diameter of the driving pin 69 is smaller, however, than the groove 67 is long in the axial direction. The support face 71 of the rear area 56 of the clamping cone is substantially flat in embodiment and is located directly on the likewise flat surface of the bottom of the shaft-like area 26. In the vicinity of the axial groove 67, however, the rear area 56 of the clamping cone is provided with a bevel 72, which begins approximately in the vicinity of the half diameter on a tipping edge 75 extending in the manner of a secant and extends obliquely toward the front, remote from the cup-shaped area 27. The spherical face 66 merges via a conical surface 73 with the front area 58 of the clamping cone.

The cup-shaped area 27 of the drive element 21 is provided with an external fine-pitch thread 76, onto which a set collar 74, in the form of a sleeve nut, can be threaded. This set collar 74 is provided with a conical recess 77, through which the conical surface 73 of the clamping cone 57 protrudes. The bottom area of the set collar 74 is provided with threaded bores, preferably three in number, distributed uniformly over the circumference, into which bores clamping screws 78 can be threaded, which are supported on the front end face 79 of the cup-shaped area 27.

In its rear area 56, the clamping cone 57 is further provided with a longitudinally central internally threaded bore 82, into which a screw 83 can be threaded with one end and which is received inside the stepped through bore 22 of the drive element 21. The shaft 84 of the screw 83 is surrounded by a restoring compression spring 85, which is supported at one end on the head 86 of the screw 83 and on the other end on an axial, inside annular face of the drive element 21.

The function of the boring and deburring head 11 is as follows: In the initial position of the boring and deburring head 11 shown in FIG. 1, in which it is not being acted upon, the axis of rotation 88 of the drive element 21 and the longitudinal axis 89 of the clamping cone 57, and thus of the boring and deburring tool 91 fastened in place, are in alignment. In this position, the boring and deburring tool 11 are caused to rotate, for instance by a boring spindle. Now if compressed air is blown into the air chamber 46 via the connection nipple 44, which is connected to a compressed air control means, then the annular piston 31 moves downward in the axial direction, which means that the two pressure pins 53 move in the same direction and press against the support surface 71 of the rear area 56 of the clamping cone 57. Since the clamping cone 57 is provided with a spherical surface 66, it can be pivoted about the tipping edge 75, which extends parallel to the line connecting the two pressure pins 53, in the direction of the arrow A between the support surface 71 and the bevel 72, so that the two axes 88 and 89 are no longer in alignment with one another; instead, the longitudinal axis 89 is at an acute angle, of a maximum of 7° in the exemplary embodiment, with respect to the axis of rotation 88. The magnitude of the pivoting movement is limited by the set collar 74, that is, by the impact of the spherical face 66 or of the conical face 73 against the conical recess 77 of the set collar 74. The play between these opposing faces depends on the depth to which the set collar 74 is screwed in. The pivoting movement is effected counter to the action of the restoring spring 85, so that when the compressed air is shut off and the air chamber 46 is evacuated, this restoring spring 85 causes the clamping cone 57, via the screw 83 that adjusts it back into the direction of rotation, to be retracted again in such a manner that the flat faces 71 and 54 oriented toward one another once again rest against one another.

FIG. 1 also shows the boring and deburring tool 91 according to a first exemplary embodiment of the present invention. This boring and deburring tool 91 was developed from a conventional spiral drill, which is provided with two front main cutting edges 92, 92' facing one another and two helical secondary cutting edges 93, 93' facing one another. In an area behind the drill tip 94, the secondary cutting edge 93 and the adjoining secondary free surface 96 of the tool 91 are provided with a deburring groove 97, the two flanks of which are provided with cutting edges 98, 99 acting in the circumferential direction. The location of this deburring groove 97 with respect to the drill tip 94 depends upon the desired opportunity of being able to regrind the main cutting edges 92, 92' of the spiral drill later. Thus the deburring groove 97 may either be immediately adjacent to the main cutting edges 92, 92' or spaced apart from them by a specific distance. In this exemplary embodiment, the boring and deburring tool 91 is equipped with diamond powder in the vicinity of the drill tip 94, at the main cutting edges 92, 92' and/or over the entire cutting portion of the spiral drill, including the flanks 98, 99 of the deburring groove 97, so that even hard materials can be simultaneously bored and deburred.

FIG. 3 shows the process of boring and deburring in one operation, in terms of the method thereof. The fastening of the boring and deburring tool 91 into the boring and deburring head 11 is effected according to FIG. 1 in such a manner that the cutting edges 98, 99 of the deburring groove 97 are located diametrically opposite the two pressure pins 53 in the drive element 21. First the through bore 13 is drilled or bored in the flat workpiece 12, which is for instance a plate of a predetermined thickness. If the boring and deburring tool 91, with its deburring groove 97 the axial length of which is equal to the thickness of the workpiece 12 that is to be bored, is located inside the through bore 13 (as shown in solid lines), then by means of a set mechanical stop or some other electronic scanning means, the progress of the bore is stopped and compressed air is delivered for a brief time, of the duration of a pulse, to the annular piston 31 during the rotational movement of the boring and deburring tool 91. During this brief period, the clamping cone 57 and thus the boring and deburring tool 91 are pivoted in such a manner that the deburring groove 97 is pivoted toward the bore rim or toward the inlet and outlet edge 16, 17. These two edges 16, 17 are thereby engaged by the cutting flanks 98, 99 of the deburring groove 97 and thereby deburred and provided with a chamfer as shown by dot-dash lines in the drawing. Since the deburring groove 97 has two cutting flanks 98 and 99, this deburring of the bore 13 is effected at both the inlet and outlet edges 16, 17. Since this workpiece is a flat workpiece 12, the angles of inclination of the two cutting flanks 98, 99 of the deburring groove 97 are identically embodied with respect to the axis of rotation. For instance, they amount to approximately 45°.

FIG. 4 shows a curved workpiece 12', which is provided with a through bore 13 that is deburred at both edges. Since in this curved workpiece 12' the length of the curve is different on the outside and on the inside over the length of the diameter of the through bore 13, the angles of the flanks 98 and 99 of the deburring groove 79 are also embodied such that they are different. In the exemplary embodiment, the cutting flank 98 that is toward the front in the boring direction is disposed at an angle of 35°, for instance, with respect to the axis of rotation of the boring and deburring tool 91, and the cutting flank 99 toward the rear in the boring direction is at an angle of 40° therefrom, for instance.

In the exemplary embodiment of the present invention shown in FIG. 5, a boring and deburring tool 91' is shown which is capable of drilling or boring two axially aligned through bores 13 and 14, one after another, in a hollow workpiece 12" such as a cylinder, and of deburring them simultaneously. This is accomplished such that the boring and deburring tool 91' has in addition to the forward deburring groove 97 a rear deburring groove 97' having cutting flanks 98' and 99', the axial distance between which is is equal to the distance between the two through bores 13 and 14 located in alignment with one another. Since in this exemplary embodiment, when the boring and deburring tool 91' pivots about a predetermined angle with respect to the axis of rotation 88 of the drive element 21, the resultant curve length is different with respect to the forward deburring groove 97 and the rear deburring groove 97', then their depths must be different as well. Thus the front deburring groove 97 is deeper than the rear deburring groove 97', and in this manner a substantially uniform deburring of all four inlet and outlet edges 16, 17 and 16', 17' of the through bores 13, 14 is accomplished. In this case again, the boring and deburring tool 91' is diamond-tipped as needed in the vicinity of the main cutting edges and/or the secondary cutting edges and the cutting flanks of the deburring grooves. The angles of the cutting flanks of the two deburring grooves 97 and 97' are again selected to be different, in accordance with the geometry of the curved body in the vicinity of the through bores. The two deburring grooves 97, 97' are located in an axial line, either in the same or in different secondary cutting edges 93, 93'.

It will be understood that in all cases the angle of the cutting flanks 98, 99 or 98', 99' of the deburring grooves 97 or 97' is dependent not only on the geometry of the workpiece but also on the magnitude of the selected pivoting movement of the boring and deburring tool 91, 91', and also on the fact of whether substantially the same deburring or the same magnitude of the chamfer is desired at both the inlet edge 16, 16' and the outlet edge 17, 17'.

I claim:

1. A boring and deburring head for fastening a boring and deburring tool, comprising:
    a drive element that can be coupled with a rotationally driven bore spindle or the like, said drive element defining a longitudinal axis of rotation and including a cup-shaped area defining an inner cylindrical face;
    a clamping device for clamping a boring and deburring tool, said clamping device defining a longitudinal axis of rotation, and being connected to the drive element to be pivotable relative thereto and such that relative rotation between the drive element and the clamping element is prevented, said clamping device including a clamping cone having a rear area defining a spherical circumferential face which is inserted, without substantial radial play, into the cup-shaped area of the drive element and in engagement with the inner cylindrical face of the cup-shaped area, as a result of which shifting of the clamping device relative to the drive element with respect to an initial position of the clamping device is permitted such that the axis of rotation of the clamping device is shifted relative to the axis of rotation of the drive element;
    shifting means connected to the clamping device for effecting shifting of the clamping device from its initial position to a shifted position; and
    restoring means connected to the clamping device for returning the clamping device to its initial position from its shifted position.

2. The boring and deburring head as defined in claim 1, wherein the drive element further defines an axial bore, wherein said restoring means includes a screw having a head, said screw being connected to the clamping cone and extending into said axial bore, and a compression spring supported between the drive element and the head of said screw, and wherein the rear area of said clamping cone is held in the cup-shaped area of the drive element by said restoring means.

3. The boring and deburring head as defined in claim 1, wherein the shifting means includes at least one pressure pin connected to the rear area of the clamping cone, and wherein said rear area of the clamping cone defines an inclined tipping surface having a tipping edge diametrically opposite to the pressure pin, said tipping surface being inclined away from the drive element.

4. The boring and deburring head as defined in claim 3, further comprising:
    a set collar connected to the cup-shaped area of the drive element, said set collar being adjustable relative to said cup-shaped area to thereby adjust the magnitude of shifting.

5. The boring and deburring head as defined in claim 1, wherein the shifting means comprises a pneumatic piston-cylinder unit.

* * * * *